(12) United States Patent
Kanazawa et al.

(10) Patent No.: US 6,947,209 B2
(45) Date of Patent: Sep. 20, 2005

(54) ANTIREFLECTION FILM AND OPTICAL ELEMENT HAVING THE SAME

(75) Inventors: Hidehiro Kanazawa, Kanagawa (JP); Kenji Ando, Kanagawa (JP); Koji Teranishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/424,912

(22) Filed: Apr. 29, 2003

(65) Prior Publication Data

US 2003/0218798 A1 Nov. 27, 2003

(30) Foreign Application Priority Data

May 22, 2002 (JP) ........................................ 2002-147920
Mar. 12, 2003 (JP) ........................................ 2003-066582

(51) Int. Cl.[7] .................................................. F21V 9/04
(52) U.S. Cl. ........................ 359/359; 359/586; 359/588
(58) Field of Search ................................ 359/350–361, 359/580–590

(56) References Cited

U.S. PATENT DOCUMENTS

| 5,661,596 | A | * | 8/1997 | Biro et al. .................. 359/359 |
| 5,885,712 | A | | 3/1999 | Otani et al. .................. 428/426 |
| 5,993,898 | A | * | 11/1999 | Nagatsuka .................. 427/162 |
| 6,261,696 | B1 | | 7/2001 | Biro et al. .................. 428/428 |
| 6,396,626 | B1 | | 5/2002 | Otani et al. .................. 359/359 |
| 6,472,087 | B1 | | 10/2002 | Otani et al. .................. 428/696 |
| 6,590,702 | B1 | * | 7/2003 | Shirai .......................... 359/359 |

FOREIGN PATENT DOCUMENTS

| JP | 7-244205 | 9/1995 |
| JP | 7-244217 | 9/1995 |
| JP | 9-258006 | 10/1997 |
| JP | 2000-206304 | 7/2000 |

* cited by examiner

*Primary Examiner*—Thong Q. Nguyen
(74) *Attorney, Agent, or Firm*—Fitzpatrick, Cella, Harper & Scinto

(57) ABSTRACT

An antireflection film includes alternately deposited high-refractive-index layers and low-refractive-index layers. The refractive indexes and extinction coefficients of the layers are such that the antireflection film exhibits sufficient antireflection characteristics even if the geometrical thickness thereof is small. An optical element having the antireflection film on a substrate exhibits high transmittance and has excellent optical characteristics.

2 Claims, 9 Drawing Sheets

ANTIREFLECTION FILM AND OPTICAL ELEMENT HAVING THE SAME

BACKGROUND OF THE INVENTION

1. Field of the Invention

The present invention relates to antireflection films for coating the surfaces of optical elements and to optical elements having the same. In particular, the present invention relates to an antireflection film advantageously used for an ArF excimer laser beam having a wavelength of 193 nm.

2. Description of the Related Art

Fluoride films have generally been used as an antireflection film for vacuum ultraviolet light. For example, Japanese Patent Laid-Open Nos. 7-244205 and 7-244217 have disclosed optical elements using a fluoride film as an antireflection film. It is, however, difficult to reduce the reflectance of the fluoride antireflection film to 0.2% or less in a targeted wavelength band. Also, the fluoride film has an inferior environmental resistance.

Accordingly, oxide films having an environmental resistance superior to that of the fluoride film, such as $Al_2O_3$ and $SiO_2$, are being increasingly used. Oxide antireflection films have been disclosed in Japanese Patent Laid-Open Nos. 09-258006 and 2000-206304. These antireflection films are composed of high-refractive-index layers containing $Al_2O_3$ and low-refractive-index layers containing $SiO_2$ that are alternately layered.

As shown in these publications, each high-refractive-index layer and each low-refractive-index layer are paired and layered on the optical element. The performance of an antireflection film depends on the number and thickness of the layers. In general, as the number of layers and the number of interfaces between the high-refractive-index layers and the low-refractive-index layers increase, the antireflection characteristics are enhanced. Also, the above publications disclose that the enhanced antireflection characteristics lead to an optical element having an increased transmittance. Therefore, antireflection films are generally formed to at least a specific thickness.

Films always absorb a certain amount of light when they transmit the light. If the geometrical thickness of the antireflection film increases, the absorption also increases, and, consequently, the transmittance of the resulting optical element is reduced. In general, as the refractive index of a film increases, the film absorbs more light. Accordingly, absorption is hardly taken into account in the low-refractive-index layers, such as $SiO_2$ layers. In the high-refractive-index layers, such as $Al_2O_3$ layers, however, absorption is not negligible from the viewpoint of optical characteristics. If an antireflection film is produced taking only reflection into account, without considering the absorption of ultraviolet light by the $Al_2O_3$ layers, the transmittance of the resulting antireflection film is reduced. Thus, the resulting element cannot sufficiently function as an optical element. The foregoing Japanese Patent Laid-Open Nos. 09-258006 and 2000-206304 have not described the absorption of ultraviolet light in the antireflection film.

In general, light absorption is expressed with an extinction coefficient. FIG. 12 is a plot showing the relationship between the refractive index and extinction coefficient of an $Al_2O_3$ layer for light of 193 nm. The refractive index is changed by varying the amount of fluoride gas introduced for forming the film. The horizontal axis and the vertical axis in FIG. 12 represent the refractive index and the extinction coefficient, respectively. FIG. 12 suggests that if the refractive index of a film is 1.67 or less, the extinction coefficient can be assumed to be 0. In a film having a refractive index of 1.67 or more, however, the extinction coefficient is more than 0, and it increases as the refractive index increases. The extinction coefficient will be described later in detail.

SUMMARY OF THE INVENTION

Accordingly, an object of the present invention is to provide an antireflection film in which the extinction coefficient for an ArF excimer laser beam having a wavelength of 193 nm is controlled to have sufficient antireflection characteristics even if the geometrical thickness thereof is small. Another object of the present invention is to provide an optical element having the antireflection film deposited on the substrate thereof to reduce the geometrical thickness of the film, and thus having an increased light transmittance and enhanced optical characteristics.

According to an aspect of the present invention, an antireflection film is provided, which includes at least one low-refractive-index layer and at least one high-refractive-index layer. Preferably, more than one of each type of layers is provided. The low-refractive-index layers have a refractive index ns satisfying the expression $1.50 \leq ns \leq 1.60$ and an extinction coefficient ks satisfying the expression $0 < ks \leq 1 \times 10^{-5}$, for ultraviolet light having a wavelength of 193 nm. The high-refractive-index layers have a refractive index na satisfying the expression $1.74 \leq na \leq 1.77$ and an extinction coefficient ka satisfying the expression $1 \times 10^{-5} \leq ka \leq 1 \times 10^{-3}$, for ultraviolet light having a wavelength of 193 nm. The total geometrical thickness of the high-refractive-index layers is in the range of about 55 to about 65 nm. Also, the low-refractive-index layers and the high-refractive-index layers are alternately layered.

The high-refractive-index layers may contain $Al_2O_3$, and the low-refractive-index layers may contain $SiO_2$.

According to another aspect of the present invention, an optical element using the above-described antireflection film is provided. The optical element includes a quartz substrate and an antireflection film composed of six layers formed on the quartz substrate, starting from one of the high-refractive index layers. The antireflection film has a design center wavelength $\lambda_o$ in the range of 180 nm to 220 nm. The respective optical thicknesses d1, d2, d3, d4, d5, and d6 of the layers at the first to sixth positions from the substrate side satisfy the following expressions:

$$0.02\lambda_o \leq d1 \leq 0.10\lambda_o,$$

$$1.00\lambda_o \leq d2 \leq 2.00\lambda_o,$$

$$0.22\lambda_o \leq d3 \leq 0.30\lambda_o,$$

$$0.22\lambda_o \leq d4 \leq 0.30\lambda_o,$$

$$0.22\lambda_o \leq d5 \leq 0.30\lambda_o, \text{ and}$$

$$0.22\lambda_o \leq d6 \leq 0.30\lambda_o.$$

The present invention is also directed to another optical element including a fluorite substrate and an antireflection film composed of seven layers formed on the fluorite substrate, starting from one of the low-refractive-index layers. The antireflection film has a design center wavelength $\lambda_o$ in the range of 180 nm to 220 nm. The optical thicknesses d1, d2, d3, d4, d5, d6, and d7 of the layers at the first to seventh positions from the substrate side satisfy the following expressions:

$$0.00\lambda_o < d1 \leq 0.15\lambda_o,$$

$$0.02\lambda_o \leq d2 \leq 0.10\lambda_o,$$

$$1.20\lambda_o \leq d3 \leq 2.0\lambda_o,$$

$$0.22\lambda_o \leq d4 \leq 0.30\lambda_o,$$

$$0.22\lambda_o \leq d5 \leq 0.30\lambda_o,$$

$$0.22\lambda_o \leq d6 \leq 0.30\lambda_o, \text{ and}$$

$$0.22\lambda_o \leq d7 \leq 0.30\lambda_o.$$

According to another aspect of the present invention, an antireflection film is provided, which includes alternately layered low-refractive-index layers and high-refractive-index layers. The low-refractive-index layers have a refractive index ns satisfying the expression $1.50 \leq ns \leq 1.60$ and an extinction coefficient ks satisfying the expression $0 < ks \leq 1 \times 10^{-5}$, for ultraviolet light having a wavelength of 193 nm. The high-refractive-index layers have a refractive index na satisfying the expression $1.68 \leq na \leq 1.74$ and an extinction coefficient ka satisfying the expression $1 \times 10^{-5} \leq ka \leq 1 \times 10^{-3}$, for ultraviolet light having a wavelength of 193 nm. The total geometrical thickness of the high-refractive-index layers is in the range of 65 to 75 nm.

The high-refractive-index layers may contain $Al_2O_3$ and the low-refractive-index layers may contain $SiO_2$.

According to another aspect of the present invention, an optical element using the above-described antireflection film is provided. The optical element includes a quartz substrate and an antireflection film composed of eight layers formed on the quartz substrate, starting from one of the high-refractive index layers. The antireflection film has a design center wavelength $\lambda_o$ in the range of 180 nm to 220 nm. The respective optical thicknesses d1, d2, d3, d4, d5, d6, d7, and d8 of the layers at the first to eighth positions from the substrate side satisfy the following expressions:

$$0.05\lambda_o \leq d1 \leq 0.20\lambda_o,$$

$$1.00\lambda_o \leq d2 \leq 1.50\lambda_o,$$

$$0.05\lambda_o \leq d3 \leq 0.15\lambda_o,$$

$$0.35\lambda_o \leq d4 \leq 0.45\lambda_o,$$

$$0.15\lambda_o \leq d5 \leq 0.25\lambda_o,$$

$$0.27\lambda_o \leq d6 \leq 0.37\lambda_o,$$

$$0.16\lambda_o \leq d7 \leq 0.26\lambda_o, \text{ and}$$

$$0.23\lambda_o \leq d8 \leq 0.33\lambda_o.$$

The present invention is also directed to another optical element using the foregoing antireflection film. The optical element includes a fluorite substrate and an antireflection film composed of nine layers formed on the fluorite substrate, starting from one of the low-refractive-index layers. The antireflection film has a design center wavelength $\lambda_o$ in the range of 180 nm to 220 nm. The optical thicknesses d1, d2, d3, d4, d5, d6, d7, d8, and d9 of the layers at the first to ninth positions from the substrate side satisfy the following expressions:

$$0.00\lambda_o < d1 \leq 0.15\lambda_o,$$

$$0.05\lambda_o \leq d2 \leq 0.20\lambda_o,$$

$$0.04\lambda_o \leq d3 \leq 1.50\lambda_o,$$

$$0.05\lambda_o \leq d4 \leq 0.15\lambda_o,$$

$$0.35\lambda_o \leq d5 \leq 0.45\lambda_o,$$

$$0.15\lambda_o \leq d6 \leq 0.25\lambda_o,$$

$$0.27\lambda_o \leq d7 \leq 0.37\lambda_o,$$

$$0.16\lambda_o \leq d8 \leq 0.26\lambda_o, \text{ and}$$

$$0.23\lambda_o \leq d9 \leq 0.33\lambda_o.$$

By controlling the extinction coefficient of each layer of the antireflection film, for an ArF excimer laser beam having a wavelength of 193 nm, the resulting antireflection film can have sufficient antireflection characteristics even if the geometrical thickness thereof is small.

By depositing the antireflection film having a reduced geometrical thickness on a substrate, an optical element having an increased light transmittance and enhanced optical characteristics can be achieved.

The above and other objects of the invention will become more apparent from the following description taken in conjunction with the accompanying drawings.

Further objects, features and advantages of the present invention will become apparent from the following description of the preferred embodiments with reference to the attached drawings.

DESCRIPTION OF THE PREFERRED EMBODIMENTS

Figure 1:
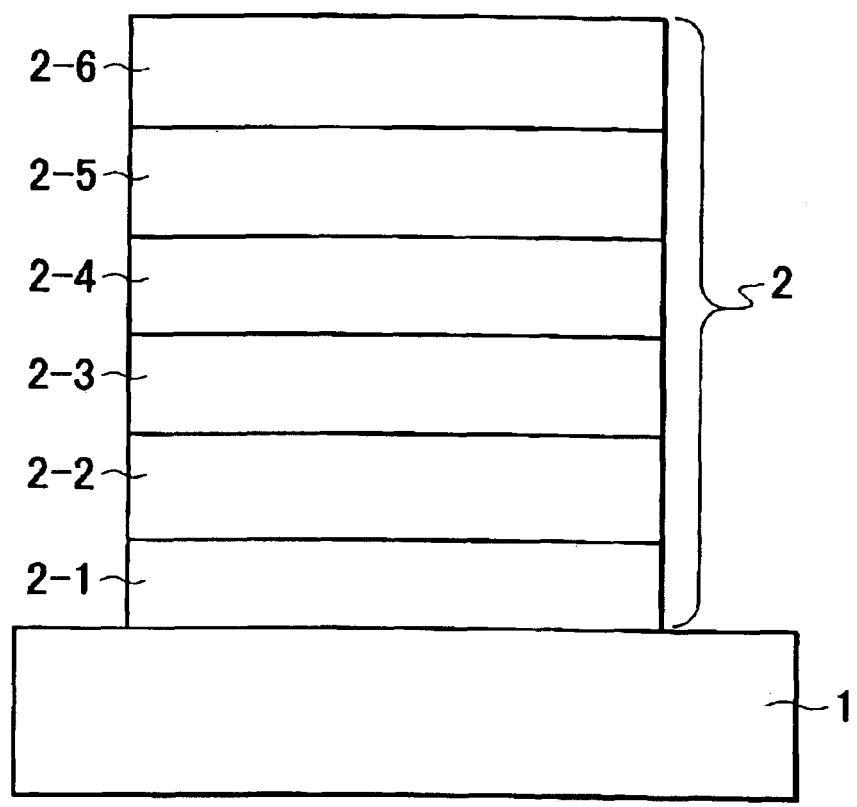
FIG. 1 is a sectional view of an optical element according to a first embodiment of the present invention.

The structural principle of an antireflection film of the present invention will now be described. Ultraviolet light emitted to an optical element having an antireflection film is divided into the light reflected from the antireflection film, light transmitted through the antireflection film, and light absorbed by the antireflection film. The percentages of the reflection, transmission, and absorption highly depend on the refractive index of the optical element. In general, the refractive index N of an optical element is expressed by equation 1 using a complex number:

$$N = n_r - i \cdot k \quad (1),$$

wherein k is an extinction coefficient.

The extinction coefficient refers to the degree of light absorption. In general, a material having an extinction coefficient k of $1 \times 10^{-3}$ or less is used for antireflection films. This is because an antireflection film with an extinction coefficient of more than $1 \times 10^{-3}$ has a significant negative effect on antireflection characteristics.

First, the description is focused on light reflection in association with reflection characteristics of the antireflection film. Reflection from the antireflection film is hardly influenced by the imaginary part $i \cdot k$ of the refractive index N, but is highly influenced by the real part $n_r$ when the extinction coefficient k is $1 \times 10^{-3}$ or less. Hence, the extinction coefficient k has little effect on the antireflection characteristics and does not need to be considered if it is $1 \times 10^{-3}$ or less.

Next, the description is focused on transmittance, which is one of the optical characteristics of the optical element having the antireflection film. When the reflectance of an antireflection film is constant, a small absorptance leads to an increased transmittance of ultraviolet light. Absorption by the antireflection film is influenced by the imaginary part $i \cdot k$ of the refractive index N, as well as the real part $n_r$. Accordingly, the extinction coefficient k of the antireflection film must be sufficiently considered. It is generally known that a material having a higher refractive index provides a higher extinction coefficient. Accordingly, the extinction coefficient of $Al_2O_3$ high-refractive-index layers has a large influence on the transmittance of the antireflection film. Also, as the geometrical thickness of the antireflection film increases, the antireflection film absorbs more ultraviolet light and, thus, the transmittance is reduced. Hence, the geometrical thickness of the antireflection film also has a large influence on the transmittance of the antireflection film.

The antireflection film of the present invention comprises alternately deposited high-refractive-index layers containing $Al_2O_3$ or the like and low-refractive-index layers containing $SiO_2$ or the like. In the antireflection film, materials of the layers are selected so that the high-refractive-index layers and the low-refractive-index layers have optimum refractive indexes and extinction coefficients, for an ArF excimer laser beam. In addition, the total geometrical thickness of the high-refractive-index layers, whose extinction coefficient is large, is set in a predetermined range. Consequently, the geometrical thickness of the resulting antireflection film can be reduced to increase the transmittance. Thus, the antireflection film has satisfactory antireflection characteristics for vacuum ultraviolet light.

If the geometrical thickness of the low-refractive-index layers, whose extinction coefficient is small, is reduced, antireflection characteristics are negatively affected. On the other hand, high-refractive-index layers whose geometrical thickness is reduced to some extent maintain their antireflection characteristics and can increase only their transmittance. Consequently, the geometrical thickness of the resulting antireflection film can be reduced to increase the transmittance. Thus, the antireflection film has satisfactory antireflection characteristics and suitably functions for vacuum ultraviolet light.

First Embodiment

A first embodiment will now be described with reference to the drawings. FIG. 1 is a sectional view of an optical element according to the first embodiment, having an antireflection film on a parallel plate substrate. The antireflection film has a design center wavelength $\lambda_o$ in the range of 180 to 220 nm, and advantageously functions particularly for an ArF excimer laser beam having a wavelength of 193 nm. The substrate may be a lens or a diffraction grating instead of the parallel plate.

Reference numerals 1 and 2 in FIG. 1 designate the substrate formed of quartz and the antireflection film, respectively. The antireflection film 2 is composed of six layers 2-1 to 2-6 counted from the substrate side. In the antireflection film 2, a high-refractive-index layer is paired with a low-refractive-index layer, and a plurality of theses pairs are layered. In this instance, the uppermost layer (surface layer) must be a low-refractive-index layer. If the uppermost layer is not a lower-refractive-index layer, the antireflection characteristics are negatively affected. The layers are, therefore, deposited on the substrate, starting from the high-refractive-index layer. Hence, layers 2-1, 2-3, and 2-5 are high-refractive-index layers containing $Al_2O_3$, and layers 2-2, 2-4, and 2-6 are low-refractive-index layers containing $SiO_2$. The low-refractive-index layers 2-2, 2-4, and 2-6 have a refractive index ns and the high-refractive-index layers 2-1, 2-3, and 2-5 have a refractive index na, for light having a wavelength in the range of 180 to 220 nm. The refractive indexes ns and na satisfy the following expressions:

$$1.50 \leq ns \leq 1.60, \text{ and}$$

$$1.74 \leq na \leq 1.77.$$

Also, the extinction coefficient ks of the low-refractive-index layers 2-2, 2-4, and 2-6 and the extinction coefficient ka of the high-refractive-index layers 2-1, 2-3, and 2-5 for light having a wavelength in the range of 180 to 220 nm satisfy the following expressions:

$$0 < ks \leq 1 \times 10^{-5}; \text{ and}$$

$$1 \times 10^{-5} \leq ka \leq 1 \times 10^{-3}.$$

The respective optical thicknesses d1 to d6 of layers 2-1 to 2-6 satisfy the following expressions:

$$0.02\lambda_o \leq d1 \leq 0.10\lambda_o,$$

$$1.00\lambda_o \leq d2 \leq 2.00\lambda_o,$$

$$0.22\lambda_o \leq d3 \leq 0.30\lambda_o,$$

$$0.22\lambda_o \leq d4 \leq 0.30\lambda_o,$$

$$0.22\lambda_o \leq d5 \leq 0.30\lambda_o, \text{ and}$$

$$0.22\lambda_o \leq d6 \leq 0.30\lambda_o.$$

The total optical thickness Dh1 (d1+d3+d5) of the high-refractive-index layers 2-1, 2-3, and 2-5 satisfy the expression $0.50\lambda_o \leq Dh1 \leq 0.60\lambda_o$. Since the optical thickness is defined by the product of the refractive index and the geometrical thickness, the total geometrical thickness Dh of high-refractive-index layers 2-1, 2-3, and 2-5 is determined to be in the range of about 55 to about 65 nm from the expression Dh1=na×Dh.

An example according to the first embodiment will now be described.

EXAMPLE 1

The optical element of Example 1 uses a synthetic quartz as the substrate. The antireflection film was deposited on the surface of the synthetic quartz substrate by sputtering. The antireflection film was composed of six layers. The layers at the first, third, and fifth positions from the substrate side were high-refractive-index layers and the layers at the second, fourth, and sixth positions were low-refractive-index layers. The high-refractive-index layers contained $Al_2O_3$ and had a refractive index of 1.763 and an extinction coefficient of $3 \times 10^{-4}$, at a wavelength of 193 nm. The low-refractive-index layers contained $SiO_2$ and had a refractive index of 1.560 and an extinction coefficient of 0, at the same wavelength. Table 1 shows the structure of the antireflection film. In this instance, the total optical thickness of the $Al_2O_3$ high-refractive-index layers, that is, of the first, third, and fifth layers, was $0.555\lambda_o$ and the geometrical thickness was about 61 nm.

TABLE 1

|  | Material | Optical thickness |
| --- | --- | --- |
| Incident medium | Air |  |
| Sixth layer | $SiO_2$ | $0.254\lambda_0$ |
| Fifth layer | $Al_2O_3$ | $0.246\lambda_0$ |
| Fourth layer | $SiO_2$ | $0.263\lambda_0$ |
| Third layer | $Al_2O_3$ | $0.243\lambda_0$ |
| Second layer | $SiO_2$ | $1.608\lambda_0$ |
| First layer | $Al_2O_3$ | $0.066\lambda_0$ |
| Emitting medium | Quartz substrate |  |

Figure 2:
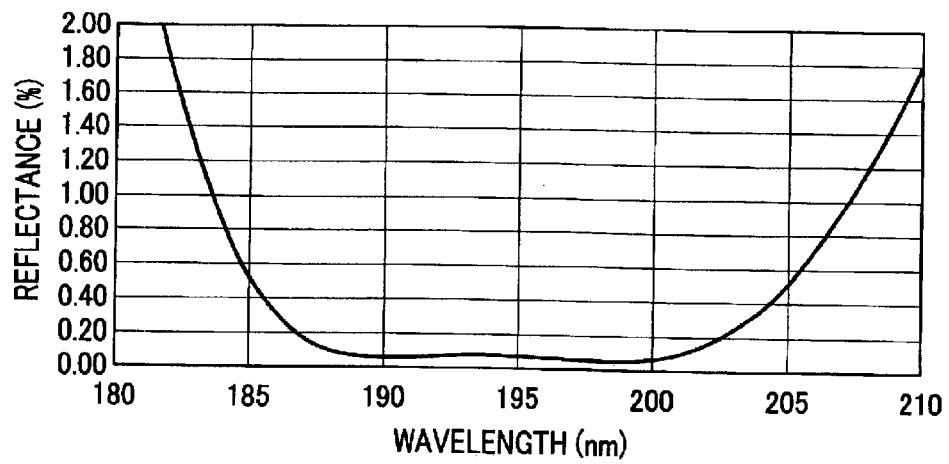
FIG. 2 is a graph showing the spectral reflectance of Example 1.

The reflection characteristics of the optical element having the antireflection film shown in Table 1 were measured by spectrophotometry. The results are shown in FIG. 2. The horizontal axis and the vertical axis represent the wavelength and the reflectance, respectively. FIG. 2 shows that the reflectance for ultraviolet light having a wavelength of 193 nm, which is the design center wavelength $\lambda_o$ of the antireflection film, is 0.1% or less. Thus, the antireflection film exhibited highly effective antireflection characteristics. In general, an antireflection film exhibiting a reflectance of 0.2% or less has excellent antireflection characteristics.

The absorptance of the antireflection film was measured by spectrophotometry for ultraviolet light having a wavelength of 193 nm, which is the design center wavelength $\lambda_o$. An absorptance of 0.14% was obtained. In general, since an antireflection film exhibiting an absorptance of 0.2% or less has excellent optical characteristics, the optical element of Example 1 has excellent optical characteristics.

EXAMPLE 2

The optical element of Example 2 uses a synthetic quartz as the substrate. An antireflection film was deposited on the surface of the synthetic quartz substrate by sputtering. The antireflection film was composed of six layers. The layers at the first, third, and fifth positions from the substrate side are high-refractive-index layers. The layers at the second, fourth, and sixth positions are low-refractive-index layers. The high-refractive-index layers contained $Al_2O_3$ and had a refractive index of 1.763 and an extinction coefficient of $3 \times 10^{-4}$, at a wavelength of 193 nm. The low-refractive-index layers contained $SiO_2$ and had a refractive index of 1.560 and an extinction coefficient of 0, at the same wavelength. Table 2 shows the structure of the antireflection film. In this instance, the total optical thickness of the $Al_2O_3$ high-refractive-index layers, that is, of the first, third, and fifth layers, was $0.585\lambda_o$ and the geometrical thickness was about 64 nm.

TABLE 2

|  | Material | Optical thickness |
| --- | --- | --- |
| Incident medium | Air |  |
| Sixth layer | $SiO_2$ | $0.254\lambda_0$ |
| Fifth layer | $Al_2O_3$ | $0.253\lambda_0$ |
| Fourth layer | $SiO_2$ | $0.257\lambda_0$ |
| Third layer | $Al_2O_3$ | $0.253\lambda_0$ |
| Second layer | $SiO_2$ | $1.103\lambda_0$ |
| First layer | $Al_2O_3$ | $0.079\lambda_0$ |
| Emitting medium | Quartz substrate |  |

Figure 3:
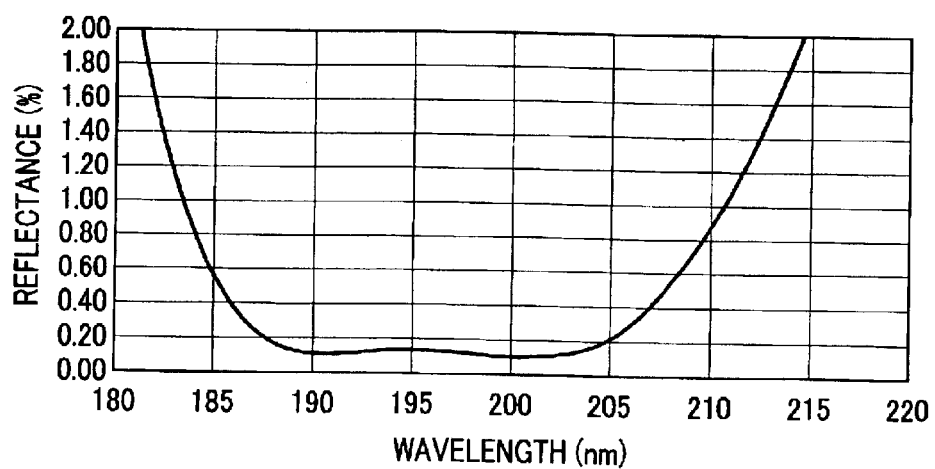
FIG. 3 is a graph showing the spectral reflectance of Example 2.

The reflection properties of the optical element having the antireflection film shown in Table 2 were measured by spectrophotometry. The results are shown in FIG. 3. The horizontal axis and the vertical axis represent the wavelength and the reflectance, respectively. FIG. 3 shows that the reflectance for ultraviolet light having a wavelength of 193 nm, which is the design center wavelength $\lambda_o$ of the antireflection film, is 0.2% or less. Thus, the antireflection film exhibited highly effective antireflection characteristics.

The absorptance of the antireflection film was measured by spectrophotometry for ultraviolet light having a wavelength of 193 nm, which is the design center wavelength $\lambda_o$, and an absorptance of 0.15% was obtained. Thus, the optical element of Example 2 exhibited excellent optical characteristics.

Second Embodiment

Figure 4:
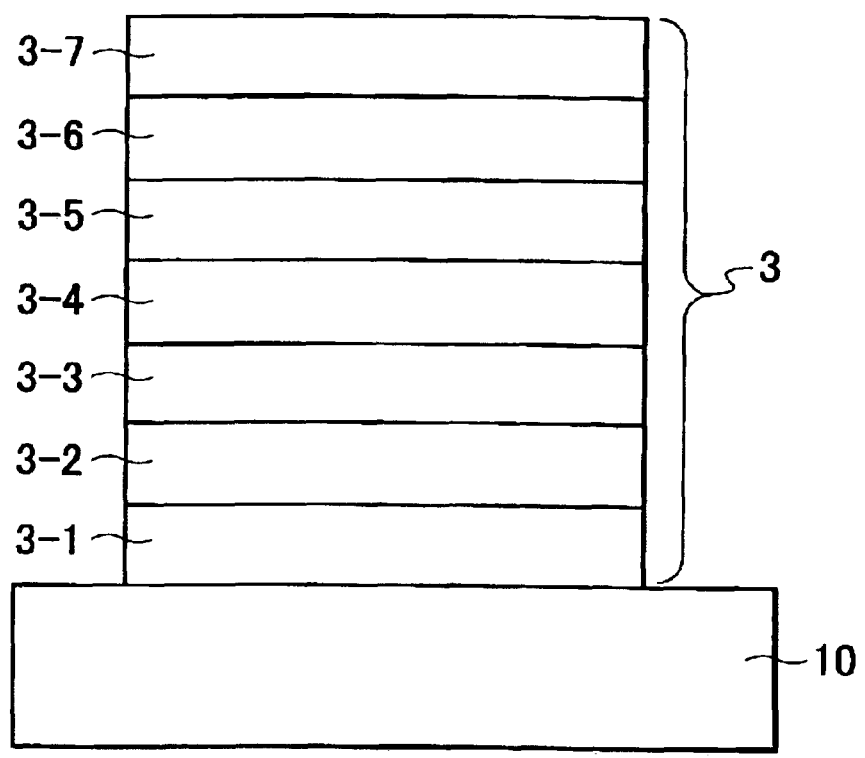
FIG. 4 is a sectional view of an optical element according to a second embodiment of the present invention.

A second embodiment will now be described with reference to the drawings. FIG. 4 is a sectional view of an optical element according to the second embodiment, having an antireflection film on a parallel plate substrate. The antireflection film has a design center wavelength $\lambda_o$ in the range of 180 to 220 nm, and advantageously functions particularly for an ArF excimer laser beam having a wavelength of 193 nm. The substrate may be a lens or a diffraction grating instead of the parallel plate.

Reference numerals 10 and 3 in FIG. 4 designate a fluorite substrate and the antireflection film, respectively. The antireflection film generally includes pairs of high-refractive-index and low-refractive index layers, as in the first embodiment shown in FIG. 1. The uppermost layer of the antireflection film is one of the low-refractive-index layers, because an alternative configuration negatively impacts the antireflection characteristics. Also, if the bottom layer in contact with the fluorite substrate is one of the high-refractive-index layer, light absorption is increased in the interface and optical characteristics are negatively affected. Accordingly, an odd number of the layers are deposited on the substrate, starting from one of the low-refractive-index layers.

The antireflection film 3 is composed of seven layers 3-1 to 3-7, counted from the substrate side. Hence, layers 3-2, 3-4, and 3-6 are high-refractive-index layers containing $Al_2O_3$ or the like, and layers 3-1, 3-3, 3-5, and 3-7 are low-refractive-index layers containing $SiO_2$ or the like. The low-refractive-index layers 3-1, 3-3, 3-5, and 3-7 have a refractive index ns and the high-refractive-index layers 3-2, 3-4, 3-6 have a refractive index na, for light having a wavelength in the range of 180 to 220 nm. The refractive indexes ns and na satisfy the following expressions:

$1.50 \leq ns \leq 1.60$, and $1.74 \leq na \leq 1.77$.

The extinction coefficient ks of the low-refractive-index layers 3-1, 3-3, 3-5, and 3-7 and the extinction coefficient of the high-refractive-index layers 3-2, 3-4, 3-6 satisfy the following expressions for light having a wavelength in the range of 180 to 220 nm:

$0 < ks \leq 1 \times 10^{-5}$, and $1 \times 10^{-5} \leq ka \leq 1 \times 10^{-3}$.

The respective optical thicknesses d1 to d7 of the layers 3-1 to 3-7 satisfy the following expressions:

$0.00\lambda_o < d1 \leq 0.15\lambda_o$, $0.02\lambda_o \leq d2 \leq 0.10\lambda_o$, $1.20\lambda_o \leq d3 \leq 2.00\lambda_o$, $0.22\lambda_o \leq d4 \leq 0.30\lambda_o$, $0.22\lambda_o \leq d5 \leq 0.30\lambda_o$, $0.22\lambda_o \leq d6 \leq 0.30\lambda_o$, and $0.22\lambda_o \leq d7 \leq 0.30\lambda_o$.

The total optical thickness Dh2 (d2+d4+d6) of the high-refractive-index layers 3-2, 3-4, and 3-6 satisfy the expression $0.50\lambda_o \leq Dh2 \leq 0.60\lambda_o$. Since the optical thickness is defined by the product of the refractive index and the geometrical thickness, the total geometrical thickness Dh of the high-refractive-index layers 3-2, 3-4, and 3-6 is determined to be in the range of about 55 to about 65 nm from the expression Dh2=na×Dh.

An example according to the second embodiment will now be described.

EXAMPLE 3

The optical element of Example 3 uses fluorite as the substrate. An antireflection film was deposited on the surface of the fluorite substrate by sputtering. The antireflection film was composed of seven layers. The layers at the first, third, fifth, and seventh positions from the substrate side were low-refractive-index layers. The layers at the second, fourth, and sixth positions were high-refractive-index layers. The low-refractive-index layers contained SiO$_2$ and had a refractive index of 1.560 and an extinction coefficient of 0, at a wavelength of 193 nm. The high-refractive-index layers contained Al$_2$O$_3$ and had a refractive index of 1.763 and an extinction coefficient of $3 \times 10^{-4}$, at the same wavelength. Table 3 shows the structure of the antireflection film. In this instance, the total optical thickness of the Al$_2$O$_3$ high-refractive-index layers, that is, of the second, fourth, and sixth layers, was $0.529\lambda_o$ and the geometrical thickness was about 58 nm.

TABLE 3

| | Material | Optical thickness |
|---|---|---|
| Incident medium | Air | |
| Seventh layer | SiO$_2$ | $0.254\lambda_0$ |

TABLE 3-continued

| | Material | Optical thickness |
|---|---|---|
| Sixth layer | Al$_2$O$_3$ | $0.246\lambda_0$ |
| Fifth layer | SiO$_2$ | $0.263\lambda_0$ |
| Fourth layer | Al$_2$O$_3$ | $0.242\lambda_0$ |
| Third layer | SiO$_2$ | $1.610\lambda_0$ |
| Second layer | Al$_2$O$_3$ | $0.041\lambda_0$ |
| First layer | SiO$_2$ | $0.133\lambda_0$ |
| Emitting medium | Fluorite substrate | |

Figure 5:
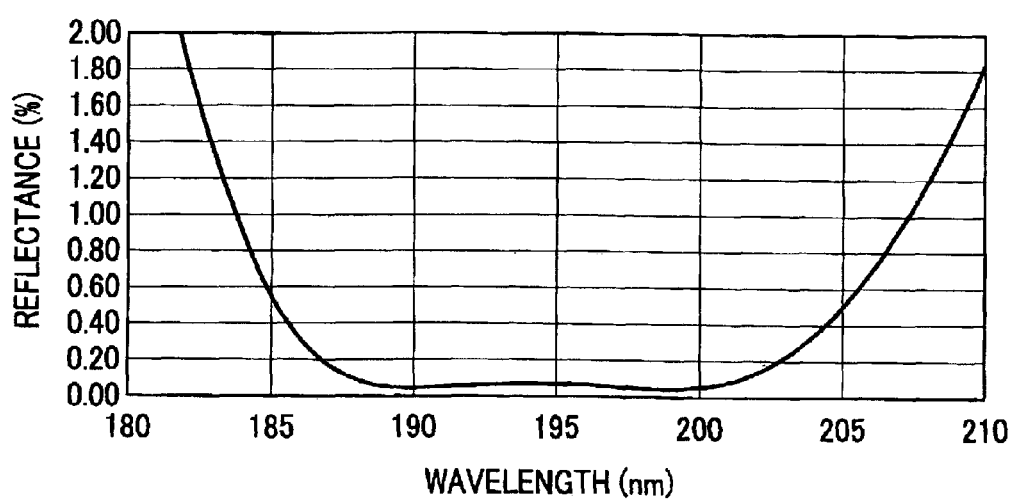
FIG. 5 is a graph showing the spectral reflectance of Example 3.

The reflection properties of the optical element having the antireflection film shown in Table 3 were measured by spectrophotometry. The results are shown in FIG. 5. The horizontal axis and the vertical axis represent the wavelength and the reflectance, respectively. FIG. 5 shows that the reflectance for ultraviolet light having a wavelength of 193 nm, which is the design center wavelength $\lambda_o$ of the antireflection film, is 0.1% or less. Thus, the antireflection film exhibited highly effective antireflection characteristics.

The absorptance of the antireflection film was measured by spectrophotometry for ultraviolet light having a wavelength of 193 nm, which is the design center wavelength $\lambda_o$, and an absorptance of 0.14% was obtained. Thus, the optical element of Example 4 exhibited excellent optical characteristics.

Third Embodiment

Figure 6:
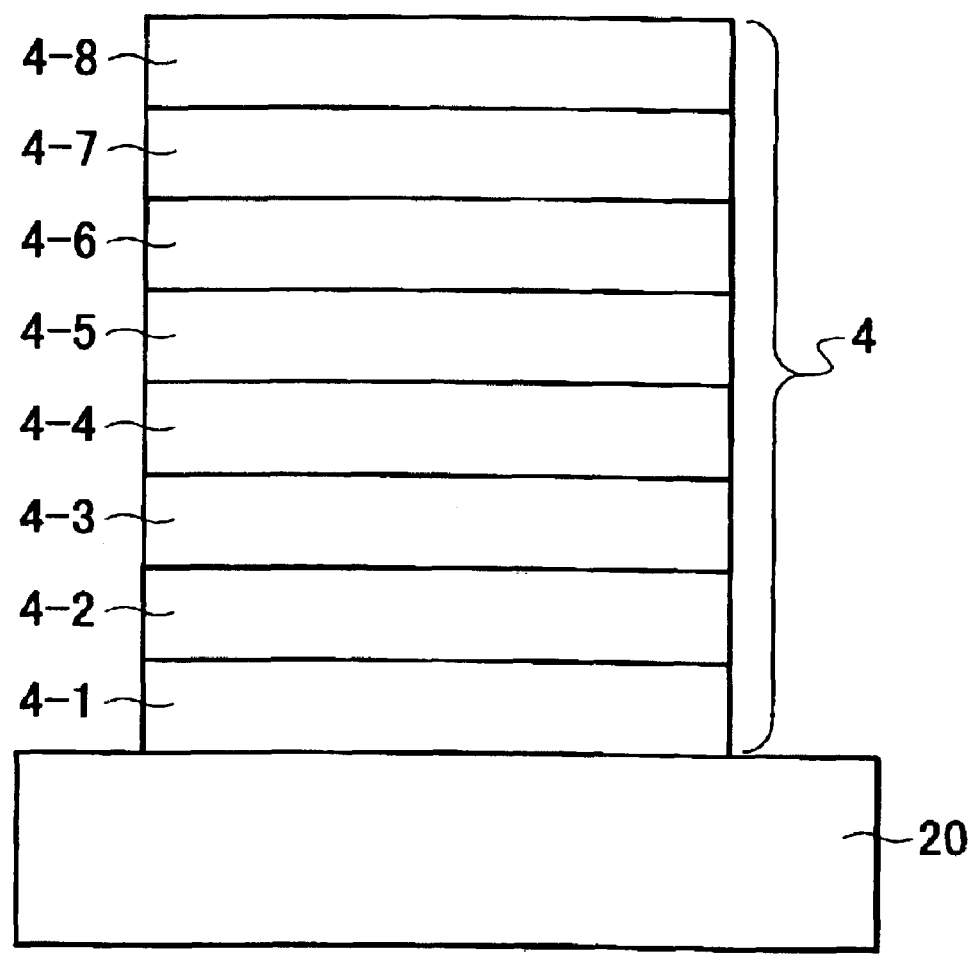
FIG. 6 is a sectional view of an optical element according to a third embodiment of the present invention.

A third embodiment of the present invention will now be described with reference to the drawings. FIG. 6 is a sectional view of an optical element according to the third embodiment, having an antireflection film on a parallel plate substrate. The antireflection film has a design center wavelength $\lambda_o$ in the range of 180 to 220 nm, and advantageously functions particularly for an ArF excimer laser beam having a wavelength of 193 nm. The substrate may be a lens or a diffraction grating instead of the parallel plate.

Reference numerals 20 and 4 in FIG. 6 designate the substrate formed of quartz and the antireflection film, respectively. The antireflection film 4 is composed of eight layers 4-1 to 4-8 counted from the substrate side. Hence, layers 4-1, 4-3, 4-5, and 4-7 are high-refractive-index layers containing Al$_2$O$_3$ or the like, and layers 4-2, 4-4, 4-6, and 4-8 are low-refractive-index layers containing SiO$_2$ or the like. The low-refractive-index layers 4-2, 4-4, 4-6, and 6-8 have a refractive index ns and the high-refractive-index layers 4-1, 4-3, 4-5, and 4-7 have a refractive index na, for light having a wavelength in the range of 180 to 220 nm. The refractive indexes ns and na satisfy the following expressions:

$1.50 \leq ns \leq 1.60$ $1.68 \leq na \leq 1.74$

The low-refractive-index layers 4-2, 4-4, 4-6, and 4-8 have an extinction coefficient ks and the high-refractive-index layers 4-1, 4-3, 4-5, and 4-7 have an extinction coefficient ka, for light having a wavelength in the range of 180 to 220 nm. The extinction coefficient ks and ka satisfy the following expressions:

$0 < ks \leq 1 \times 10^{-5}$ $1 \times 10^{-5} \leq ka \leq 1 \times 10^{-3}$

The respective optical thicknesses d1 to d8 of the layers 4-1 to 4-8 satisfy the following expressions:

$0.05\lambda_o \leq d1 \leq 0.20\lambda_o,$ $1.00\lambda_o \leq d2 \leq 1.50\lambda_o,$ $0.05\lambda_o \leq d3 \leq 0.15\lambda_o,$ $0.35\lambda_o \leq d4 \leq 0.45\lambda_o,$ $0.15\lambda_o \leq d5 \leq 0.25\lambda_o,$ $0.27\lambda_o \leq d6 \leq 0.37\lambda_o,$ $0.16\lambda_o \leq d7 \leq 0.26\lambda_o,$ and $0.23\lambda_o \leq d8 \leq 0.33\lambda_o.$ The total optical thickness Dh3 (d1+d3+d5+d7) of the high-refractive-index layers 4-1, 4-3, 4-5, and 4-7 satisfy the expression $0.59\lambda_o \leq Dh3 \leq 0.67\lambda_o$. Since the optical thickness is defined by the product of the refractive index and the geometrical thickness, the total geometrical thickness Dh of the high-refractive-index layers 4-1, 4-3, 4-5, and 4-7 is determined to be in the range of about 65 to 75 nm from the expression Dh3=na×Dh.

An example according to the third embodiment will now be described.

EXAMPLE 4

The optical element of Example 4 uses a synthetic quartz as the substrate. An antireflection film was deposited on the surface of the synthetic quartz substrate by sputtering. The antireflection film was composed of eight layers. The layers at the first, third, fifth, and seventh positions from the substrate side are high-refractive-index layers. The layers at the second, fourth, sixth, and eighth positions are low-refractive-index layers. The high-refractive-index layers contained $Al_2O_3$ and had a refractive index of 1.763 and an extinction coefficient of $3 \times 10^{-4}$, at a wavelength of 193 nm. The low-refractive-index layers contained $SiO_2$ and had a refractive index of 1.560 and an extinction coefficient of 0, at the same wavelength. Table 4 shows the structure of the antireflection film. In this instance, the total optical thickness of the $Al_2O_3$ high-refractive-index layers, that is, of the first, third, fifth, and seventh layers, was $0.659\lambda_o$ and the geometrical thickness was about 72 nm.

TABLE 4

| | Material | Optical thickness |
|---|---|---|
| Incident medium | Air | |
| Eighth layer | $SiO_2$ | $0.261\lambda_0$ |
| Seventh layer | $Al_2O_3$ | $0.218\lambda_0$ |
| Sixth layer | $SiO_2$ | $0.297\lambda_0$ |
| Fifth layer | $Al_2O_3$ | $0.200\lambda_0$ |
| Fourth layer | $SiO_2$ | $0.355\lambda_0$ |
| Third layer | $Al_2O_3$ | $0.114\lambda_0$ |
| Second layer | $SiO_2$ | $1.121\lambda_0$ |
| First layer | $Al_2O_3$ | $0.127\lambda_0$ |
| Emitting medium | Quartz substrate | |

Figure 7:
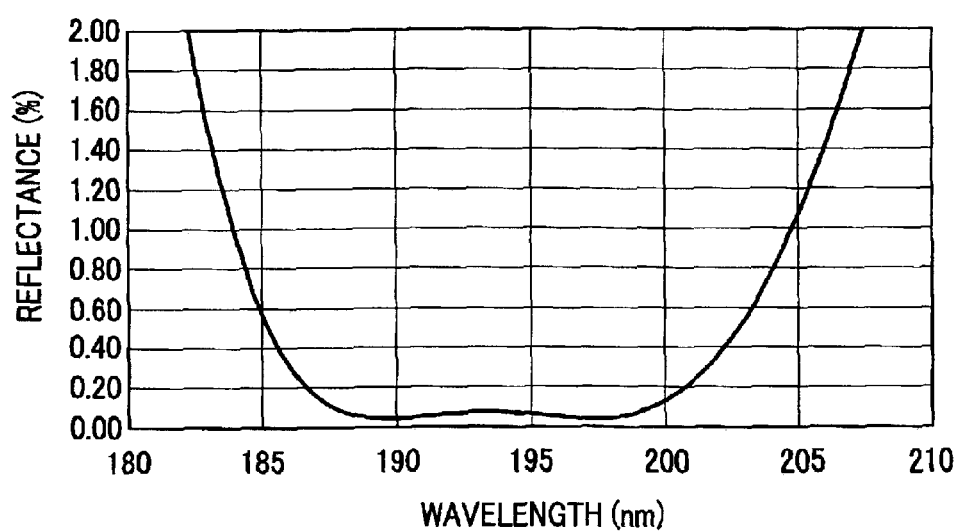
FIG. 7 is a graph showing the spectral reflectance of Example 4.

The reflection properties of the optical element having the antireflection film shown in Table 4 were measured by spectrophotometry. The results are shown in FIG. 7. The horizontal axis and the vertical axis represent the wavelength and the reflectance, respectively. FIG. 7 shows that the reflectance for ultraviolet light having a wavelength of 193 nm, which is the design center wavelength $\lambda_o$ of the antireflection film, is 0.1% or less. Thus the antireflection film exhibited highly effective antireflection characteristics.

The absorptance of the antireflection film was measured by spectrophotometry for ultraviolet light having a wavelength of 193 nm, which is the design center wavelength $\lambda_o$, and an absorptance of 0.16% was obtained. Thus, the optical element of Example 4 exhibited excellent optical characteristics.

Fourth Embodiment

Figure 8:
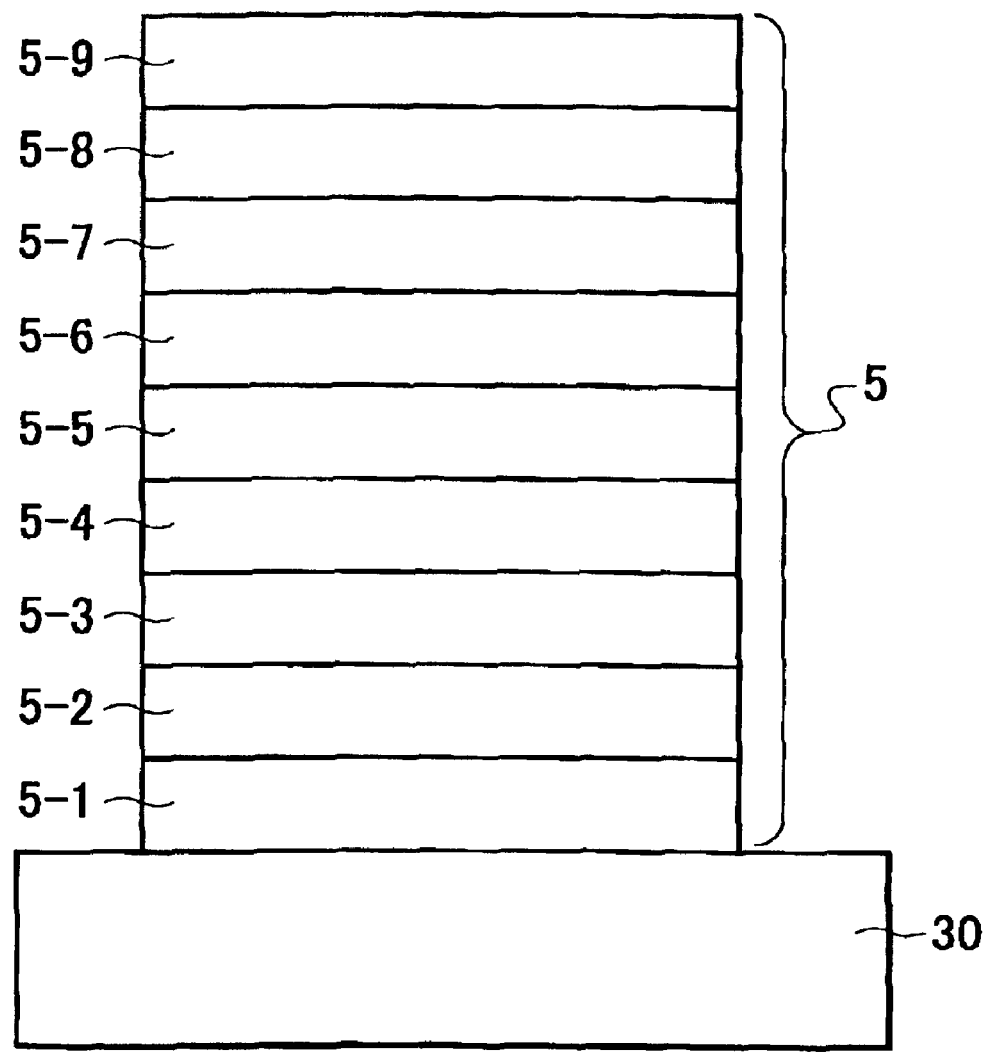
FIG. 8 is a sectional view of an optical element according to a fourth embodiment of the present invention.

A fourth embodiment of the present invention will now be described with reference to the drawings. FIG. 8 is a sectional view of an optical element according to the fourth embodiment, having an antireflection film on a parallel plate substrate. The antireflection film has a design center wavelength $\lambda_o$ in the range of 180 to 220 nm, and advantageously functions particularly for an ArF excimer laser beam having a wavelength of 193 nm. The substrate may be a lens or a diffraction grating instead of the parallel plate.

Reference numerals 30 and 5 in FIG. 8 designate the substrate formed of fluorite and the antireflection film, respectively. The antireflection film 5 is composed of nine layers 5-1 to 5-9 counted from the substrate side. Hence, layers 5-1, 5-3, 5-5, 5-7, and 5-9 are low-refractive-index layers containing $SiO_2$ or the like, and layers 5-2, 5-4, 5-6, and 5-8 are high-refractive-index layers containing $Al_2O_3$ or the like. The low-refractive-index layers 5-1, 5-3, 5-5, 5-7, and 5-9 have a refractive index ns and the high-refractive-index layers 5-2, 5-4, 5-6, and 5-8 have a refractive index na, for light having a wavelength in the range of 180 to 220 nm. The refractive indexes ns and na satisfy the following expressions:

$1.50 \leq ns \leq 1.60,$ and $0.68 \leq na \leq 1.74.$

The low-refractive-index layers 5-1, 5-3, 5-5, 5-7, and 5-9 have an extinction coefficient ks and the high-refractive-index layers 5-2, 5-4, 5-6, and 5-8 have an extinction coefficient ka, for light having a wavelength in the range of 180 to 220 nm. The extinction coefficients ks and ka satisfy the following expressions:

$0 < ks \leq 1 \times 10^{-5},$ $1 \times 10^{-5} \leq ka \leq 1 \times 10^{-3}.$ The respective optical thicknesses d1 to d9 of the layers 5-1 to 5-9 satisfy the following expressions:

$0.00\lambda_o < d1 \leq 0.15\lambda_o$ $0.05\lambda_o \leq d2 \leq 0.20\lambda_o,$ $0.04\lambda_o \leq d3 \leq 1.50\lambda_o,$ $0.05\lambda_o \leq d4 \leq 0.15\lambda_o,$ $0.35\lambda_o \leq d5 \leq 0.45\lambda_o,$ $0.15\lambda_o \leq d6 \leq 0.25\lambda_o,$ $0.27\lambda_o \leq d7 \leq 0.37\lambda_o,$ $0.16\lambda_o \leq d8 \leq 0.26\lambda_o,$ and $0.23\lambda_o \leq d9 \leq 0.33\lambda_o.$ The total optical thickness Dh4 (d2+d4+d6+d8) of the high-refractive-index layers 5-2, 5-4, 5-6, and 5-8 satisfy the expression $0.59\lambda_o \leq Dh4 \leq 0.67\lambda_o$. Since the optical thickness is defined by the product of the refractive index and the geometrical thickness, the total geometrical thickness Dh of the high-refractive-index layers 5-2, 5-4, 5-6, and 5-8 is determined to be in the range of about 65 to 75 nm from the expression Dh4=na×Dh.

An example according to the fourth embodiment will now be described.

EXAMPLE 5

The optical element of Example 5 uses fluorite as the substrate. An antireflection film was deposited on the surface of the fluorite substrate by sputtering. The antireflection film was composed of nine layers. The layers at the first, third, fifth, seventh, and ninth positions from the substrate side are low-refractive-index layers. The layers at the second, fourth, sixth, and eighth positions are high-refractive-index layers. The low-refractive-index layers contained $SiO_2$ and had a refractive index of 1.560 and an extinction coefficient of 0, at a wavelength of 193 nm. The high-refractive-index layers contained $Al_2O_3$ and had a refractive index of 1.763 and an extinction coefficient of $3\times10^{-4}$, at the same wavelength. Table 5 shows the structure of the antireflection film. In this instance, the total optical thickness of the $Al_2O_3$ high-refractive-index layers, that is, of the second, fourth, sixth, and eighth layers, was $0.623\lambda_o$ and the geometrical thickness was about 68 nm.

TABLE 5

| | Material | Optical thickness |
|---|---|---|
| Incident medium | Air | |
| Ninth layer | $SiO_2$ | $0.261\lambda_0$ |
| Eighth layer | $Al_2O_3$ | $0.218\lambda_0$ |
| Seventh layer | $SiO_2$ | $0.298\lambda_0$ |
| Sixth layer | $Al_2O_3$ | $0.200\lambda_0$ |
| Fifth layer | $SiO_2$ | $0.355\lambda_0$ |
| Fourth layer | $Al_2O_3$ | $0.115\lambda_0$ |
| Third layer | $SiO_2$ | $1.135\lambda_0$ |
| Second layer | $Al_2O_3$ | $0.090\lambda_0$ |
| First layer | $SiO_2$ | $0.091\lambda_0$ |
| Emitting medium | Fluorite substrate | |

Figure 9:
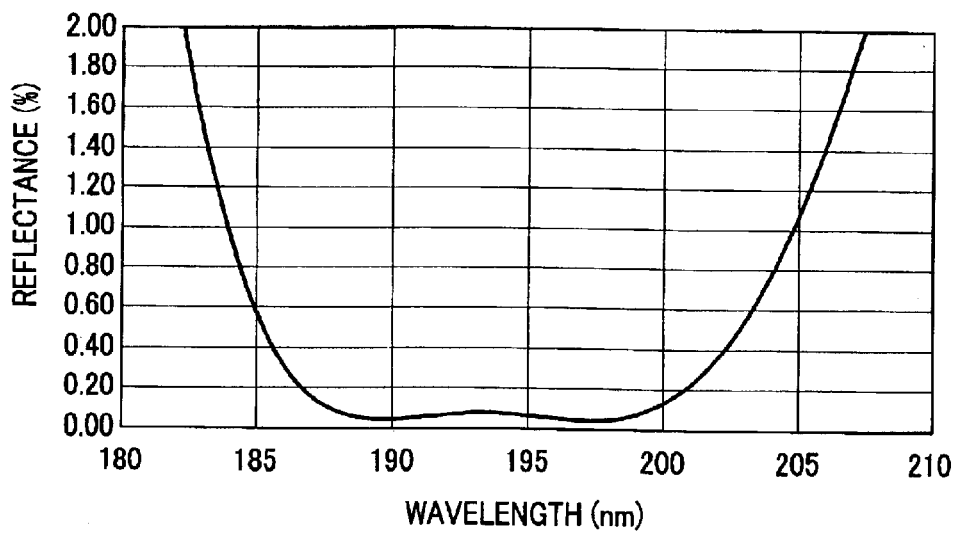
FIG. 9 is a graph showing the spectral reflectance of Example 5.

The reflection properties of the optical element having the antireflection film shown in Table 5 were measured by spectrophotometry. The results are shown in FIG. 9. The horizontal axis and the vertical axis represent the wavelength and the reflectance, respectively. FIG. 9 shows that the reflectance for ultraviolet light having a wavelength of 193 nm, which is the design center wavelength $\lambda_o$ of the antireflection film, is 0.1% or less. Thus, the antireflection film exhibited highly effective antireflection characteristics.

The absorptance of the antireflection film was measured by spectrophotometry for ultraviolet light having a wavelength of 193 nm, which is the design center wavelength $\lambda_o$, and an absorptance of 0.15% was obtained. Thus, the optical element of Example 4 exhibited excellent optical characteristics.

COMPARATIVE EXAMPLE

For comparison, the same measurement as in Examples 1 to 5 described above are performed on the antireflection film of Example 5 in Japanese Patent Laid Open No. 2000-206304. A synthetic quartz plate was used as the substrate. An antireflection film was deposited on the surface of the synthetic quartz substrate by sputtering. The antireflection film was composed of eight layers. The layers at the first, third, fifth, and seventh positions from the substrate side are high-refractive-index layers and the layers at the second, fourth, sixth, and eighth positions are low-refractive-index layers. The low-refractive-index layers were formed of $SiO_2$ and had a refractive index of 1.560 at a wavelength of 193 nm, and the high-refractive-index layers were formed of $Al_2O_3$ and had a refractive index of 1.763 at the same wavelength. Table 6 shows the structure of the antireflection film. The total optical thickness of the $Al_2O_3$ high-refractive-index layers, that is, of the first, third, fifth, and seventh layers, was $1,000\lambda_o$ and the total geometrical thickness was about 110 nm. This thickness is 1.69 to 2.00 times as large as the total geometrical thicknesses, 55 to 65 nm, of the high-refractive-index layers in above-described Examples 1 to 5.

TABLE 6

| | Material | Optical thickness |
|---|---|---|
| Incident medium | Air | |
| Eighth layer | $SiO_2$ | $0.276\lambda_0$ |
| Seventh layer | $Al_2O_3$ | $0.252\lambda_0$ |
| Sixth layer | $SiO_2$ | $0.292\lambda_0$ |
| Fifth layer | $Al_2O_3$ | $0.238\lambda_0$ |
| Fourth layer | $SiO_2$ | $0.352\lambda_0$ |
| Third layer | $Al_2O_3$ | $0.453\lambda_0$ |
| Second layer | $SiO_2$ | $1.005\lambda_0$ |
| First layer | $Al_2O_3$ | $0.057\lambda_0$ |
| Emitting medium | Quartz substrate | |

Figure 10:
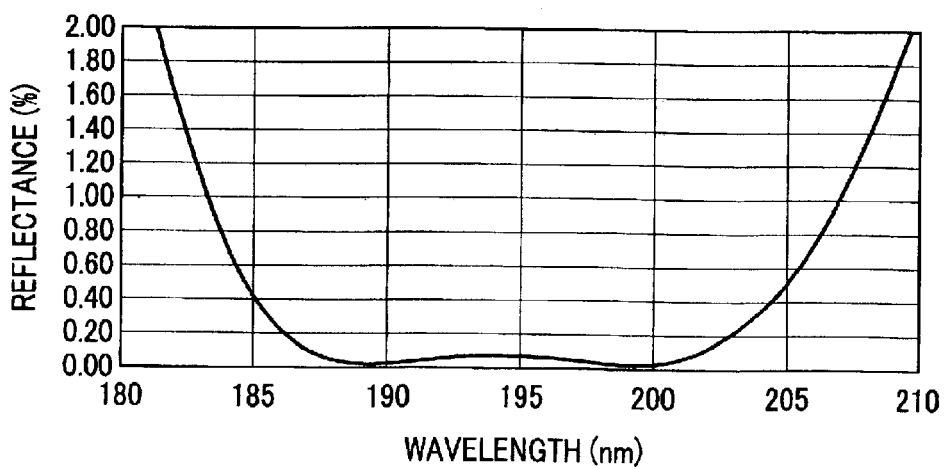
FIG. 10 is a graph showing the spectral reflectance of Comparative Example 1.

The reflection properties of the optical element having the antireflection film shown in Table 6 were measured by spectrophotometry. The results are shown in FIG. 10. The horizontal axis and the vertical axis represent the wavelength and the reflectance, respectively. FIG. 10 shows that the reflectance for ultraviolet light having a wavelength of 193 nm, which is the design center wavelength $\lambda_o$ of the antireflection film, is 0.1% or less. Thus, the antireflection film exhibited highly effective antireflection characteristics.

Figure 11:
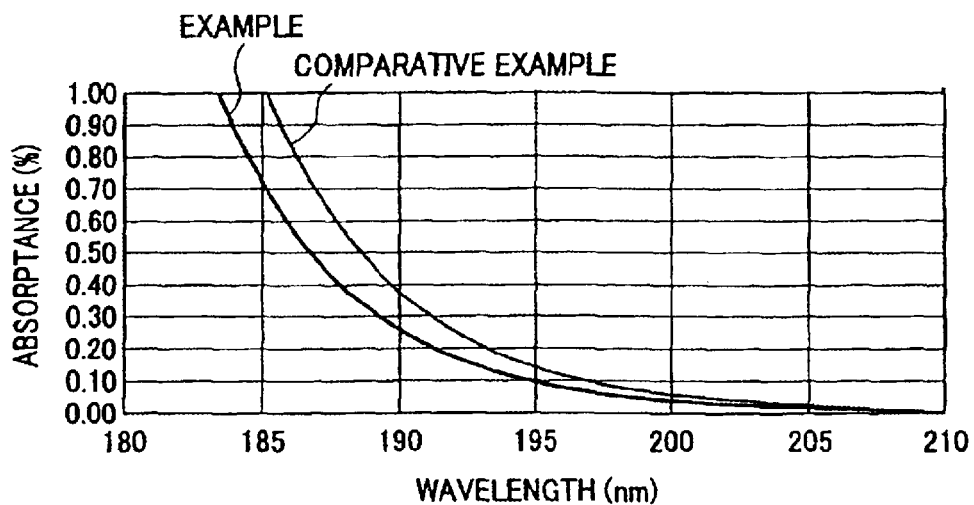
FIG. 11 is a graph showing the spectral absorption of Example 1 and Comparative Example 1.
Figure 12:
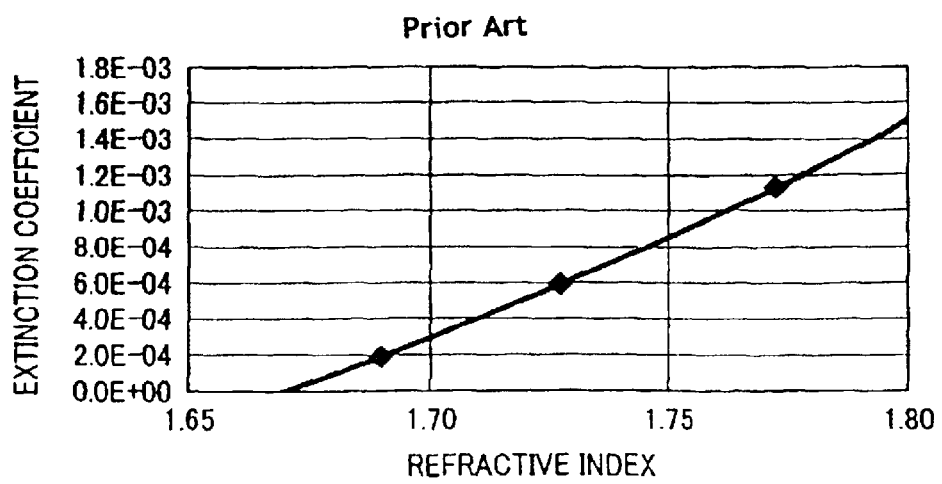
FIG. 12 is a graph showing the relationship between the refractive index and the extinction coefficient.

The spectral absorption of the optical element having the antireflection film shown in Table 6 was also measured by spectrophotometry. The results are shown in FIG. 11. The horizontal axis and the vertical axis represent the wavelength and the absorptance, respectively. FIG. 11 also shows the spectral absorption in Example 1, for comparison. The absorptances in Example 1 and Comparative Example 1 are respectively about 0.14% and 0.21% at a wavelength of 193 nm. In general, an antireflection film having a reflectance of 0.2% or less exhibits excellent antireflection characteristics. The antireflection film of Example 1, therefore, has sufficiently low absorbance, and, accordingly, the resulting optical element has excellent optical characteristics. In contrast, the antireflection film in the Comparative Example has an absorbance higher than that in Example 1, and, accordingly, the optical characteristics of the optical element in the Comparative Example are inferior.

The embodiments described above have illustrated the antireflection films for an ArF excimer laser beam having a wavelength of 193 nm. However, the antireflection film of the present invention is not limited to the uses associated with the ArF excimer laser beam. This antireflection film has similar antireflection characteristics of used with laser beams and other types of light having a wavelength in the range of about 180 to 220 nm. By disposing the antireflection film on a substrate, the resulting optical element can exhibit excellent optical characteristics for not only the ArF excimer laser beam, but also for other types of light.

The substrate used in the optical element is not limited to quartz and fluorite, and any material may be used as long as it has a transmittance as high as that of quartz or fluorite.

A combination of a plurality of optical elements having the antireflection film may be applied to optical systems, such as the systems for illuminating an exposure apparatus and for projectors.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation, so as to encompass all such modifications and equivalent structures and functions.

What is claimed is:

1. An optical element comprising:

a quartz substrate; and an antireflection film comprising:

four low-refractive-index layers each of which has a refractive index ns satisfying the expression $1.50 \leq ns \leq 1.60$ and an extinction coefficient ks satisfying the expression $0 < ks \leq 10^{-5}$, for ultraviolet light having a wavelength of 193 nm; and four high-refractive-index layers each of which has a refractive index na satisfying the expression $1.68 \leq na \leq 1.74$ and an extinction coefficient ka satisfying the expression $1\ 10^{-5} \leq ka \leq 1 \times 10^{-3}$, for ultraviolet light having a wavelength of 193 nm, a total geometrical thickness of each of the four high-refractive index layers being in a range of about 65 to about 75 nm, wherein the four low-refractive-index layers and the four high-refractive-index layers are alternately formed on the quartz substrate such that one of the high-refractive index layers is a most proximal layer of the antireflection film to the quartz substrate, wherein the antireflection film has a design center wavelength $\lambda_o$ in a range of 180 nm to 220 nm, and wherein respective optical thicknesses d1, d2, d3, d4, d5, d6, d7, and d8 of the high-refractive-index and low-refractive-index layers at a first to eighth positions from a substrate side satisfy the following expressions:

$0.05\lambda_o \leq d1 \leq 0.20\lambda_o$, $1.00\lambda_o \leq d2 \leq 1.50\lambda_o$, $0.05\lambda_o \leq d3 \leq 0.15\lambda_o$, $0.35\lambda_o \leq d4 \leq 0.45\lambda_o$, $0.15\lambda_o \leq d5 \leq 0.25\lambda_o$, $0.27\lambda_o \leq d6 \leq 0.37\lambda_o$, $0.16\lambda_o \leq d7 \leq 0.26\lambda_o$, and $0.23\lambda_o \leq d8 \leq 0.33\lambda_o$.

2. The optical element according to claim 1, wherein at least one of the high-refractive-index layers comprises $Al_2O_3$ and at least one of the low-refractive-index layers comprises $SiO_2$.

* * * * *

UNITED STATES PATENT AND TRADEMARK OFFICE
CERTIFICATE OF CORRECTION

PATENT NO.  : 6,947,209 B2
DATED       : September 20, 2005
INVENTOR(S) : Hidehiro Kanazawa et al.

It is certified that error appears in the above-identified patent and that said Letters Patent is hereby corrected as shown below:

Column 10,
Line 47, "6-8" should read -- 4-8 --.

Column 13,
Line 63, "measurement" should read -- measurements --.

Column 14,
Line 65, "of" should read -- as those --.

Column 15,
Line 34, "1 $10^{-5}$" should read -- 1 x $10^{-5}$ --.

Column 16,
Line 13, "positions" should read -- position --.

Signed and Sealed this

Twenty-first Day of February, 2006

JON W. DUDAS
*Director of the United States Patent and Trademark Office*